May 15, 1951 — R. M. NARDONE — 2,552,859
CABLE OPERATION
Filed Feb. 7, 1949
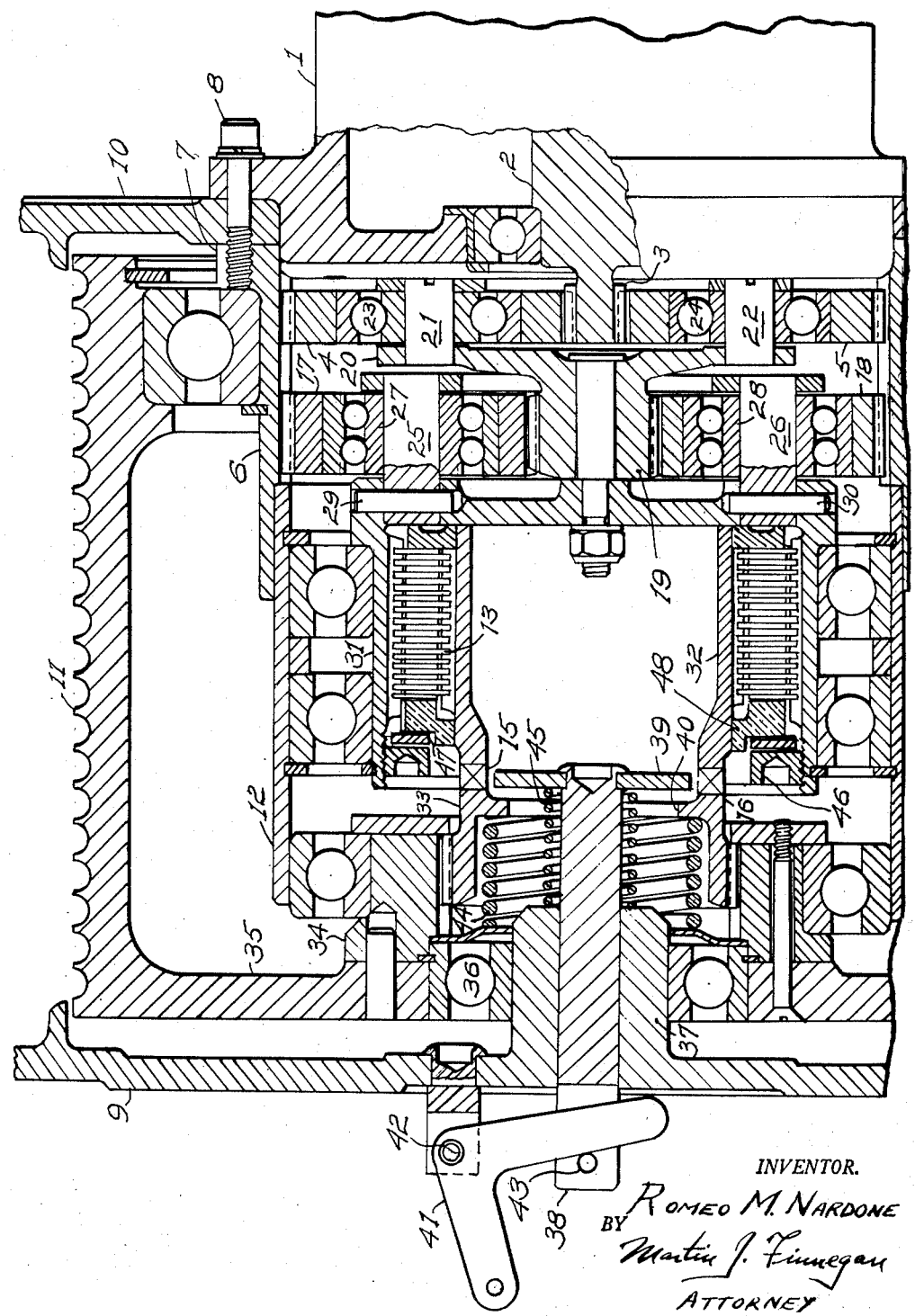
INVENTOR.
ROMEO M. NARDONE
BY Martin J. Finnegan
ATTORNEY Patented May 15, 1951

2,552,859

UNITED STATES PATENT OFFICE 2,552,859

CABLE OPERATION

Romeo M. Nardone, Teaneck, N. J., assignor to Joseph J. Mascuch, Maplewood, N. J.

Application February 7, 1949, Serial No. 75,005

8 Claims. (Cl. 254—187)

This invention relates to cable operation, and particularly to the winding of a cable on a rotatable drum, in response to application of rotative effort to such drum.

An object of the invention is to provide a rotatable drum and means associated therewith in novel fashion both for rotatably supporting the drum and for imparting driving energy thereto.

A second object of the invention is to provide, in a rotatable drum operating assembly, novel means for inter-relating the drum-rotating and drum-supporting means so that both are disposed concentrically within the end limits of the drum itself. In this connection a feature of the invention is the provision of a pair of telescopically joined cylinders extending into the interior of the drum, from one end thereof to a point adjacent the other end of the drum; the said cylinders acting as carriers for a plurality of bearing assemblies, one of which directly supports one end of the drum while the others support the gears and clutch elements by which the drum's rotation is effected and controlled.

A third object is to provide, in a drum assembly including operating gears and clutch elements, novel means for controlling the clutch action; said novel means including a pair of nested spring coils, one of which serves to maintain intermeshing clutch elements normally engaged, while the other yieldably urges the clutch disengaging linkage out of contact with the clutch elements and thereby protects such linkage against vibrational forces set up in the rotating assembly.

Other objects of the invention reside in the specific construction and inter-action of component elements of the complete invention, as will be apparent upon examinaion of the following description of the embodiment of the invention illustrated in the accompanying drawing.

Reference number 1 of the drawing designates the housing of a motor having an armature shaft 2 terminating in a reduced end portion 3 provided with gear teeth to form a pinion adapted to mesh with a pair of planetary gears 4, 5 which in turn are adapted to rotate in an orbit defined by internally toothed cylinder 6; the said cylinder 6 being flanged, as indicated at 7, for attachment (by screws 8) to one of a pair of supporting plates 9, 10 between which is rotatably mounted the drum 11.

Telescopically secured within cylinder 6, is a second cylinder 12 extending to a position of proximity to plate 9, so that the combined cylinders 6, 12 span almost the entire width of the drum 11, to serve as the supporting means for the clutch assemblies 13 and 15—16, as well as the planetary gear trains 4, 5, and 17, 18; the latter meshing centrally with a "sun" pinion 19, and peripherally with the teeth of cylinder 6. Pinion 19 is an integral part of a plate 20 carrying studs 21, 22 and bearing assemblies 23, 24 on which the gears 4, 5 revolve. Similar studs 25, 26 and bearing assemblies 27, 28 support the gears 17, 18, and pins 29, 30 secure the studs 25, 26 to the outer one of a pair of concentric barrels 31, 32 that are drivably connected by a pack of friction discs 13, of which alternate ones are splined to the outer barrel 31 while the remaining discs are splined to the inner barrel 32.

The barrel 32 has clutch teeth 15 cut in its end surface to mesh with corresponding clutch teeth 16 on the end of a sleeve 33 splined to slide along corresponding splines of an outer sleeve 34 fastened to the end wall 35 of the drum 11, to transmit to the drum the rotary motion of the clutch elements 15, 16. The end wall 35 is centrally apertured to receive a ball-bearing assembly 36 carried on a boss 37 integral with a supporting plate 9. Also carried by boss 37 is a rod 38 and a collar 39 shiftable with said rod to engage the rim 40 of sleeve 33, and thus interrupt the drive from clutch teeth 15 to clutch teeth 16, whenever bell-crank 41 is swung about its pivot bearing 42, to move rod 38 to the left; there being a cross-pin 43 to the bifurcated end of rod 38 for engagement by the bell-crank. Outer spring 44 normally maintains the clutch parts 15, 16 in engagement, while inner spring 45 exerts sufficient pressure on collar 39 to preclude any vibratory or chattering action during operation of the drum by way of the motor-driven gear train and clutch.

When clutch 15, 16 is disengaged, by the manual shifting of bell-crank 41 as just described, the drum 11 may be rotated manually, independently of motor 1. Normally, however, the drive will be by way of motor 1, the gear train, and the two clutch combinations 13 and 15—16, in series; the clutch 15—16 being held normally engaged by spring 44, and the clutch discs 13 being of sufficient capacity to transmit the drive without slipping, except on any occasion when the load on the drum becomes excessive. The torque value at which slipping occurs depends upon the degree of tightening of annular adjusting nut 46 along the threads on the end of barrel 31. Interposed between adjusting nut 46 and the discs 13 is a corrugated, or wavy, washer 47 of spring steel, to provide the desired degree of resilience in the application of driving pressure to the discs 13. If necessary, an annular block 48 of non-metallic material may also be inserted, for thrust absorption and proper spacing of the parts.

It will be observed that the telescopically joined cylinders 6 and 12 extend almost all the way through the drum, and serve to rotatably support substantially the entire transmission mechanism; the cylinder 6 also serving as the orbital track for both stages of the planetary reduction gear train. This "packaging" of substantially all of the transmission mechanism in the joined cylinders 6, 12 facilitates assembly and disassembly, and makes it unnecessary to resort to any complications in the structure of the drum itself.

What I claim is:

1. In a cable winding mechanism, in combination with a drum, a pair of parallel supporting plates, one on either side of said drum, a first cylinder secured to one of said plates and extending into said drum, in concentric relation thereto, a second cylinder telescopically received within said first cylinder, and means for rotating said drum, said means including a gear train planetating about said first cylinder, and clutch mechanism rotatably supported within said second cylinder.

2. Cable winding mechanism as defined in claim 1, wherein said drum rotating means further includes driving connections between said clutch mechanism and the side of said drum adjacent the other of said parallel plates.

3. Cable winding mechanism as defined in claim 2, wherein said second parallel plate includes a boss aligned with said clutch mechanism, and further including means carried by said boss for rotatably supporting said driving connections.

4. In cable winding mechanism as defined in claim 3, means including a rod slidable through said boss for controlling engagement and disengagement of said clutch mechanism.

5. Cable winding mechanism as defined in claim 4, wherein said clutch controlling means further includes a collar carried by said rod, and resilient means normally holding said collar spaced away from said clutch mechanism and thereby protecting said rod against vibratory impact during operation of the clutch to transmit torque to said drum.

6. Cable winding mechanism as defined in claim 5, including additional resilient means for exerting engaging pressure on said clutch mechanism.

7. In a cable winding mechanism, in combination with a drum having a pair of aligned cylinders extending into the drum, in concentric relation thereto, a gear train including reaction elements integral with one of said cylinders, and means rotatably mounted in the other of said cylinders for drivably connecting said gear train to said drum.

8. Cable winding mechanism as defined in claim 7, wherein said connecting means includes a pre-set friction disc clutch having a toothed clutch element as an integral part thereof, a complementary clutch element aligned with said toothed clutch element, and means constantly urging said complementary clutch element toward engagement with said toothed clutch element.

ROMEO M. NARDONE.

REFERENCES CITED

The following references are of record in the file of this patent:

UNITED STATES PATENTS

| Number | Name | Date |
|---|---|---|
| 2,391,172 | Leland | Dec. 18, 1945 |
| 2,448,674 | Lawler | Sept. 7, 1948 |